United States Patent
Davidson et al.

(10) Patent No.: US 6,434,121 B1
(45) Date of Patent: *Aug. 13, 2002

(54) TELEPHONE AGENT CALL MANAGEMENT SYSTEM

(75) Inventors: Wayne Alan Davidson, Winfield; Diana Schlag Winter, Chicago, both of IL (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 07/748,147

(22) Filed: Aug. 21, 1991

Related U.S. Application Data

(63) Continuation of application No. 07/291,813, filed on Dec. 29, 1988, now Pat. No. 5,062,103.

(51) Int. Cl.[7] .................................................. H04J 3/02
(52) U.S. Cl. ....................... 370/270; 370/384; 370/422; 370/904; 379/111; 379/214.01; 379/265.11; 379/269; 379/94.14
(58) Field of Search ............................. 370/110.1, 58.1, 370/58.2, 60, 270, 384, 422, 904; 379/112, 214, 265, 268, 111, 214.01, 265.11, 269, 94.14

(56) References Cited

U.S. PATENT DOCUMENTS

| | | | |
|---|---|---|---|
| 4,277,649 A | | 7/1981 | Sheinbein .................. 179/18 B |
| 4,656,624 A | * | 4/1987 | Collins et al. .................. 370/60 |
| 4,670,628 A | | 6/1987 | Boragtis et al. ............... 379/69 |
| 4,763,353 A | | 8/1988 | Canale et al. ................ 379/157 |
| 4,769,833 A | * | 9/1988 | Farleigh et al. ......... 379/102.01 |
| 4,788,682 A | * | 11/1988 | Vij et al. .................. 370/110.1 |
| 5,062,103 A | * | 10/1991 | Davidson et al. ........ 370/110.1 |
| 5,073,890 A | * | 12/1991 | Danielson ................... 370/58.2 |

OTHER PUBLICATIONS

D. L. Huebner, "Intelligent Telephones And Generic Switching: A Distributive Processing PABX Architecture", *Proceedings Of The International Switching Symposium*, Session 23A, Paper 1, Florence, May 1984, pp. 1–6.

* cited by examiner

*Primary Examiner*—Min Jung
(74) *Attorney, Agent, or Firm*—Werner Ulrich

(57) ABSTRACT

A computer connected to an ISDN central office switch via an ISDN digital subscriber line, provides management information regarding activities of a plurality of telephone agents. The computer has shared call appearances with a number of telephone agent stations and receives shared call appearance associated messages from the switch reflecting call handling messages exchanged between the ISDN switch and each of the agent stations. The messages are interpreted by the computer, which generates station status information and management information such as the number of calls handled, average holding time per call, etc. The computer may be connected simultaneously to several central offices via ISDN subscriber lines and generate management information for a group of geographically separated agents, such as home telemarketing agents operating out of their individual homes and connected to different central offices. Based on the generated status and management information, the computer performs an incoming call management function by selecting agents connected to different switches for handling incoming calls and transmitting to the ISDN switch appropriate messages for causing the switch to transfer incoming calls to the selected agents. Additionally, the computer performs an outgoing call management function by initiating outgoing calls and causing the switch to connect an answering party to an agent, selected by the computer on any of the switches.

6 Claims, 10 Drawing Sheets

TELEPHONE AGENT CALL MANAGEMENT SYSTEM

CROSS-REFERENCE TO RELATED APPLICATION

This is a continuation of application Ser. No. 07/291,813 filed Dec. 29, 1988 now U.S. Pat. No. 5,062,103.

The following U.S. applications, which are assigned to the assignee of the instant application and filed concurrently herewith, have related subject matter:

(1) Automated Call Handling Apparatus: by W. A. Davidson and D. S. Winter.

(2) Telephone Agent Management Information System: by W. A. Davidson and S. Hossain.

FIELD OF THE INVENTION

The invention relates to the automatic handling of calls for a plurality of agent stations. More particularly, the invention pertains to an agent call management arrangement which is not an integral part of the switching system to which the agent stations are connected.

BACKGROUND OF THE INVENTION

Some companies such as retail stores, may employ a number of telephone agents for answering inquires, taking orders, doing telemarketing and the like. Incoming calls to a publicized directory number are commonly distributed to telephone answering agents by the central office or PBX switching system to which the agents are connected. This can be done in accordance with a predefined algorithm, such as forwarding the next call to the agent who has been idle the longest. Call distribution schemes which are integral to a central office require significant overhead and are expensive on a per-agent basis when the number of agents is relatively small. Call distribution may be provided by customer premises PBX systems and key telephone systems. However, such prior art systems require telephone switching equipment on customer premises and may require special interfaces to a telephone central office. For a small company with a limited number of lines, the PBX systems and even the key systems can be expensive on a per-line basis. Systems for handling outgoing calls for telemarketing agents are known as well. One known system employs a computer which places calls to a list of customers by means of automatic dialing equipment and employs signal detection circuitry to determine when a called party answers. A switch on customer premises is used to connect the telephone lines to the agents. Problems of the prior art outgoing call management systems are the cost and inflexibility of the special equipment, such as additional switching equipment, which the customer has to supply and the difficulty of reliably performing such functions as detecting called party answer on an automated basis on the customer premises.

SUMMARY OF THE INVENTION

In accordance with this invention, a computer connected to a switching system distributes incoming calls among a plurality of telephone agent stations or assigns outgoing calls to agents using call related data received from the switch. In accordance with one aspect of this invention, the computer is connected to a switching system adapted for the Integrated Services Digital Network (ISDN) by means of an ISDN subscriber line. Using a feature of the switch known as the ISDN shared call appearance, the computer receives messages from the switch which are representative of call handling information transmitted between the switching system and each of the individual agent stations. In this manner, the computer derives information about the availability of each of the agent stations. In a particular embodiment of the invention, all incoming calls for the agents are directed to the computer by the switching system and the computer transfers the incoming calls to a telephone agent selected by the computer based on agent availability information. The computer also has the capability to initiate outgoing calls to predefined customer directory numbers using standard ISDN messaging and receives the standard call handling messages generated by the switching system, including a message indicating that the called party has answered. Thereafter, the computer transmits an ISDN message to the switching system causing it to interconnect an agent selected by the computer with the answering party. In accordance with this invention, the computer manages calls for a plurality of agents by selecting available agents and distributing the calls to the agents by the sending of standard ISDN messages to the switch. Advantageously, the computer selects agents on the basis of information provided by the switching system through which the call is established, rather than on the basis of information detected from a subscriber line used in a call, as is common in prior art systems. Furthermore, all of the switching functions are performed by the switching system handling the calls rather than by an auxiliary switch such as the one employed in key systems.

In accordance with another aspect of the invention the computer may be connected to more than one switching system by means of ISDN subscriber lines, thereby sharing call appearances with a number of agent stations connected to different switching systems. This arrangement is particularly advantageous in an environment wherein agents are working out of their homes or several offices scattered throughout a geographical area, and connected to different central offices. Particularly, the computer collects agent status information through the shared call appearance feature of each of the several offices to which it is connected. Furthermore, incoming calls to a general directory number at a first ISDN office to which the computer is connected may be forwarded under control of the computer to agents connected to the same or different central offices. This is accomplished by establishing a call from the computer through the first office to an agent connected to the second office and causing the first office to bridge the incoming call and the agent call. Advantageously, the computer may make outgoing calls through any office to which it is connected by means of the ISDN line and setup outgoing calls for agents connected to several different central offices and located geographically remote from the computer.

It is a particular advantage of this invention that the handling of calls for a plurality of agents is done inexpensively by means of a computer such as a personal computer rather than more expensive special purpose equipment as is known in the prior art. It is a further specific advantage of this invention that a single computer can manage incoming and outgoing calls for remotely located agents connected to different central offices.

In accordance with another aspect of the invention, the computer is connected to the ISDN line by means of a known ISDN/computer interface which translates ISDN messages into computer messages and vice versa Advantageously, the computer therefore communicates directly with the central office and does not need to use automatic dialers or other external equipment commonly used in the prior art. Neither is special signal detection equipment or the like required in order to determine whether a called party has answered. In accordance with this invention, the computer is responsive to standard ISDN messages from the switch to ascertain that the called party has answered and acts to connect an agent to the established call.

BRIEF DESCRIPTION OF THE DRAWING

The invention may be better understood from the following detailed description when read in conjunction with the drawing in which.

DETAILED DESCRIPTION

Figure 1:
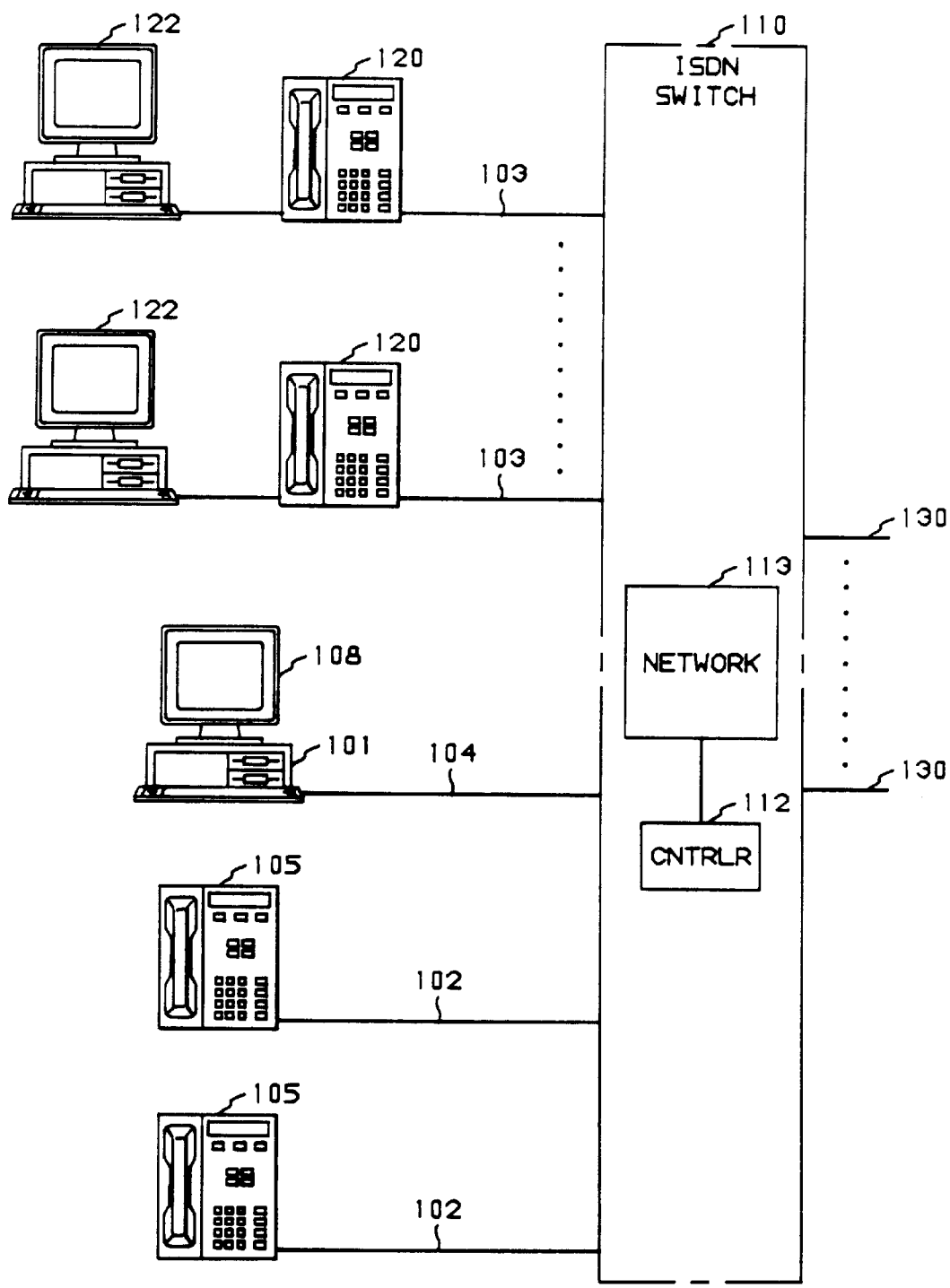
FIG. 1 is a representation of an ISDN switch together with a plurality of agent stations and a computer, connected to the switch via individual subscriber lines.

FIG. 1 is a representation of an illustrative telecommunication system including agent stations 120 and an agent call management arrangement separate from the switching system. The agent call management arrangement includes a computer 101 which is connected via a standard ISDN digital subscriber line 104 to an ISDN central office switch 110. A company may employ a number of agents at the companies premises which may be its business office. Typically, a company will advertise one or more telephone numbers to which customers or prospective customers may place calls in order to obtain more information about a product or service of the company or to place orders. Several agents may be required to answer the calls directed to the published telephone number and typically the incoming calls are distributed among the several agents by means of a switching system. In accordance with the present invention, all calls to a published number or several different published numbers are routed from the ISDN switch 110 to the computer 101 via a standard ISDN subscriber line, which may have multiple call appearances. Additionally, the computer, by means of the ISDN shared call appearance feature, receives associated messages from the switch which correspond to call handling messages exchanged between the switch and each of the agent stations 120. The computer interprets the associated shared call appearance messages and generates and records data relating to the operational state of each of the agent stations 120. When a call is received by the ISDN switch, for example from one of the subscriber stations 105, connected to the switch via subscriber lines 101 or a call is received via an interoffice trunk such as one of the trunks 130, a connection is set up between the incoming line or trunk and the ISDN subscriber line 104 connected to the computer 101. The computer 101, on the basis of information collected with respect to the operational state of the agent stations selects one of- the agent stations to handle the call. The computer originates a call through the ISDN switch 110 to the selected one of the agent stations 120 and transmits an ISDN explicit transfer message to the switch 110 via subscriber line 104. The switch responds to the message by connecting the incoming call to the selected agent station and clearing the connections to the computer. In this arrangement, the ISDN switch functions simply to route and interconnect calls. The functions of selecting agents and distributing incoming calls to the agents is performed by the computer 101, connected to the switch via a standard ISDN telephone subscriber line.

The computer 101 also has the capability of making outgoing calls when provided with a list of customer numbers to be called. The computer 101 originates an outgoing call by transmitting standard ISDN messages via subscriber line 104 through switch 110, for example, to one of the stations 105 or, over one of the interoffice trunks 130 and another central office, to a selected customer station. When the customer answers the call, switch 110 will transmit the ISDN CONNECT message to the computer 101, which will select an available one of the agents 120 and initiate a call through switch 110 to the selected agent station. Thereafter, the computer transmits the ISDN TRANSFER message to the switch causing the switch to establish the necessary connection between the two calls in a known manner. The agent stations 120 may have associated computer display terminals 122 connected to the ISDN station set via a well-known RS232 connection for supporting data communications through the station set over the ISDN line 103 in a well known manner. The computer 101, may provide customer profile data to the agent display terminal as part of the function of handing off the customer to the agent. The data may be transmitted by establishing a data call through the ISDN switch 110 to the computer display terminal 122. In this illustrative system, the line connecting the computer 101 to the switch is a standard ISDN line. However, one or more of the agent stations 120 may be analog stations and the lines 103 between the agent stations 120 and the switch 110 may be analog lines. In that case, the switch will send analog signals to the analog station and ISDN associated messages to the computer and the display terminals may be connected to the switch by data modems in a well known manner.

The ISDN switch 110 may be a well-known telecommunication switch adapted for use in the Integrated Services Digital Network. One such switch is disclosed in U.S. Pat. No. 4,592,048 of M. W. Beckner et.al., entitled "Integrated Packet Switching and Circuit Switching System". The system includes a controller 112 which controls the interchange of ISDN messages between the switch 110 and the agent stations 120 as well as the computer 101 and other stations 105. A network 113 functions under control of controller 112 to provide the necessary interconnections within the switch 110. The agent stations 120 and subscriber stations 105 may be any well-known ISDN stations adapted to interface via an ISDN digital subscriber line with an ISDN switching system or standard analog stations. The interface between an ISDN station and an ISDN switch is specified generally by the International Telegraph and Telephone Consultative Committee (CCITT) and more specifically defined in a document entitled "5ESS Switch ISDN Basic Rate Interface Specification" published by AT&T in 1985. This document specifies the messages that are transmitted from the switch to the ISDN station, also referred to as an ISDN terminal, as well as the messages that are expected to be transmitted from the terminal to the switch. The interface between the switch and the terminal is referred to as an ISDN basic rate 2B+D interface. The 2B+D designation refers to the two 64 kilobit channels for the transmission of encoded voice or data and the 16 kilobit D-channel used primarily for the transmission of control messages, contained in the ISDN subscriber line. In a typical scenario, the ISDN switch responds to an incoming call directed to a connected subscriber station by transmitting a SETUP message to the station. The station responds with an ALERTING message indicating that an alerting signal is being generated at the station. This will be followed by a CONNECT message when the station goes off hook. A DISCONNECT message may be transmitted from the switch to the terminal or vice versa depending upon whether the calling terminal or the called terminal initiates the disconnect.

The aforementioned Basic Rate Interface document includes key system features, defining interactions between key systems and the central office switch for two or more associated telephone terminals sharing call appearances. As described in the afore referenced interface documents, so-called associated messages are sent from the central office switch to each of the associated telephone terminals. As mentioned above, ISDN call handling messages such as call SETUP, ALERTING, CONNECT, DISCONNECT, etc. are transmitted between the switching system and the telephone terminal. Associated messages are messages transmitted to an associated terminal and correspond to certain of the messages transmitted between a principal terminal and the switch. For example, when a call is extended to one of the agent stations 120, the agent station and the computer 101 will both receive a call SETUP message. Only the agent terminal will respond to the message. Thereafter the switch communicates with the agent terminal and transmits associated messages to the computer, which interprets the associated messages and generates data defining agent station activity.

Figure 2:
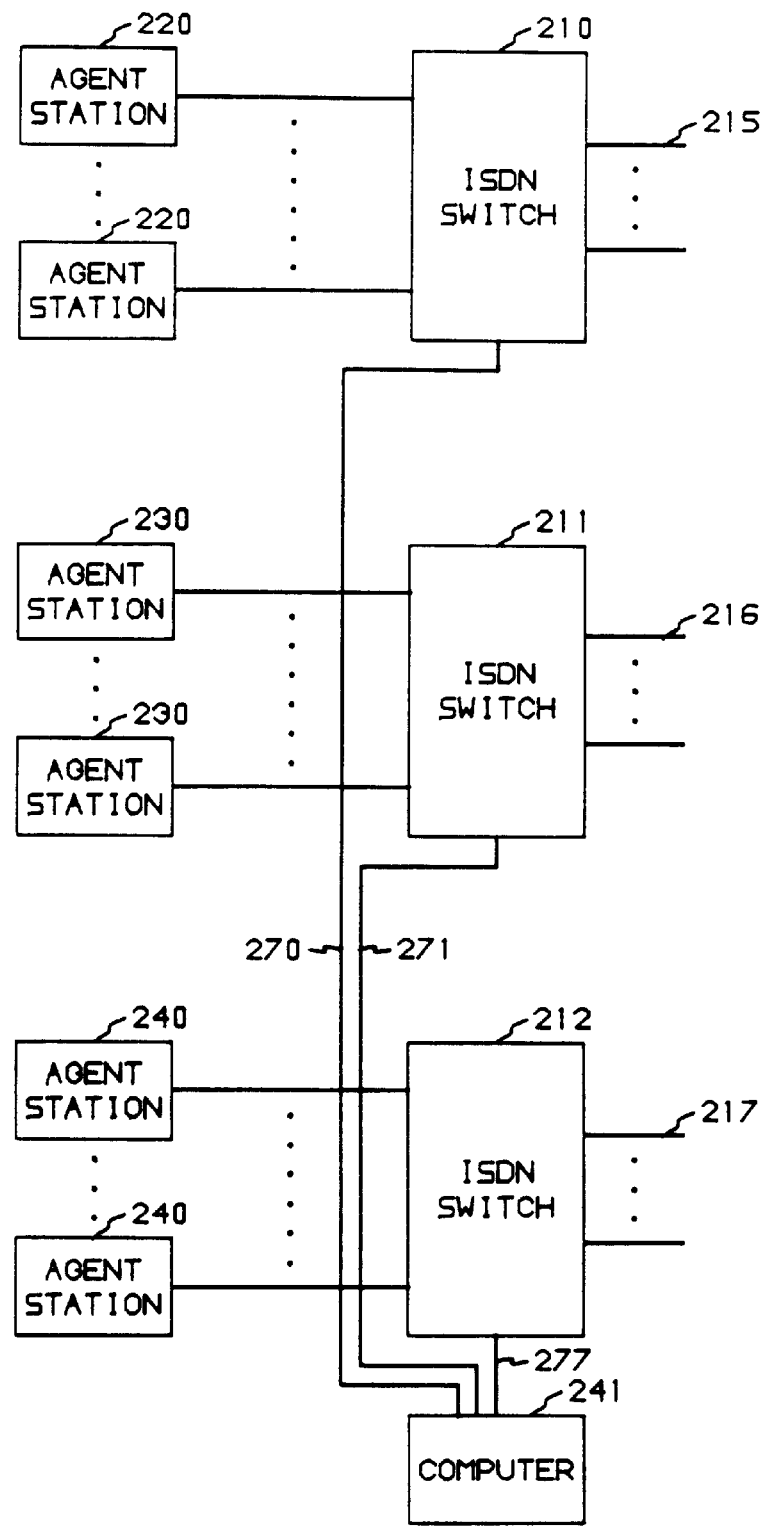
FIG. 2 is a representation of a plurality of ISDN switches and agent stations, and a computer connected to each of the switches via individual subscriber lines.

FIG. 2 is a block diagram representation of a plurality of ISDN switches 210, 211 and 212 which have the same characteristics as switch 110 of FIG. 1. Each has a plurality of agent stations 220, 230 and 240 connected thereto, respectively. The switches 210, 211 and 212 may be situated in geographically separated locations and the agent stations 220, 230 and 240 may all belong to one company having agents operating out of geographically separated offices or agents' homes. The agent stations may be either analog stations connected via an analog subscriber line or digital stations connected via an ISDN line. The stations 220, 230, 240 may include a data display terminal such as the display terminal 122 of FIG. 1. A computer 241 is connected to each of the switches 210, 211 and 212. The computer 241 may be connected to switch 212 via a standard ISDN line 277 and to switches 210 and 211 via foreign exchange lines 270 and 271, respectively. Foreign exchange lines are subscriber lines from a distant central office, frequently located in another city. An ISDN foreign exchange line, is a subscriber line from a distant ISDN switching office having the same characteristics and protocols as a standard ISDN line described in the aforementioned Basic Rate Interface document. By means of the subscriber lines between each of the switches 210, 211 and 212 and the computer 241, the computer can share call appearances with the agent stations connected to each of the switches. On the basis of associated ISDN messages received from each of these switches, the computer 241 generates activity data with respect to each of the agent stations connected to each of the switches. When an incoming call to a published directory number is received, for example in switch 212, the call may be routed to computer 241 which will select one of the agent stations connected to any one of the switches to which the computer has a connection. For example, the computer 241 may select one of the agent stations 220 connected to the switch 210. The computer 241 will initiate a call via ISDN switch 212 and ISDN switch 210 to the selected one of the agent stations 220 and cause the switch 212 to interconnect the two calls. The ISDN switches 210, 211 and 212 are interconnected in the customary fashion of central offices. Each of the switches 210, 211 and 212 has a plurality of subscriber lines and interoffice trunks 215, 216 and 217, respectively which connect to other subscriber lines and to other central offices. For outgoing calls to preselected customers, the computer 241 is able to place calls by transmitting the appropriate ISDN messages via the standard ISDN subscriber line 277 or the foreign exchange lines 270 and 271. A call will be set up between the computer and the called party through the selected switch. By way of example, if the computer 241 were to extend a call through ISDN switch 211 via lines and trunks 216 to a selected customer, a connection would be set up in the switch 211 between the customers line or trunk and foreign exchange line 271. The computer 241 might select one of the agent stations 220 to handle the call and initiate a call between the computer and the selected one of the agent stations 220 via foreign exchange line 271, ISDN switch 211, one of the interoffice trunks 216 and ISDN switch 210. Subsequently, it will transmit a transfer message to the ISDN switch 211 to establish the connection between the agent call and the customer call. Similarly, the connection between the called customer and one of the agent stations 230 can be established through the ISDN switch 211 or with one of the agent stations 240 through ISDN switch 211 and ISDN switch 212 using interoffice trunks between the switches.

Figure 3:
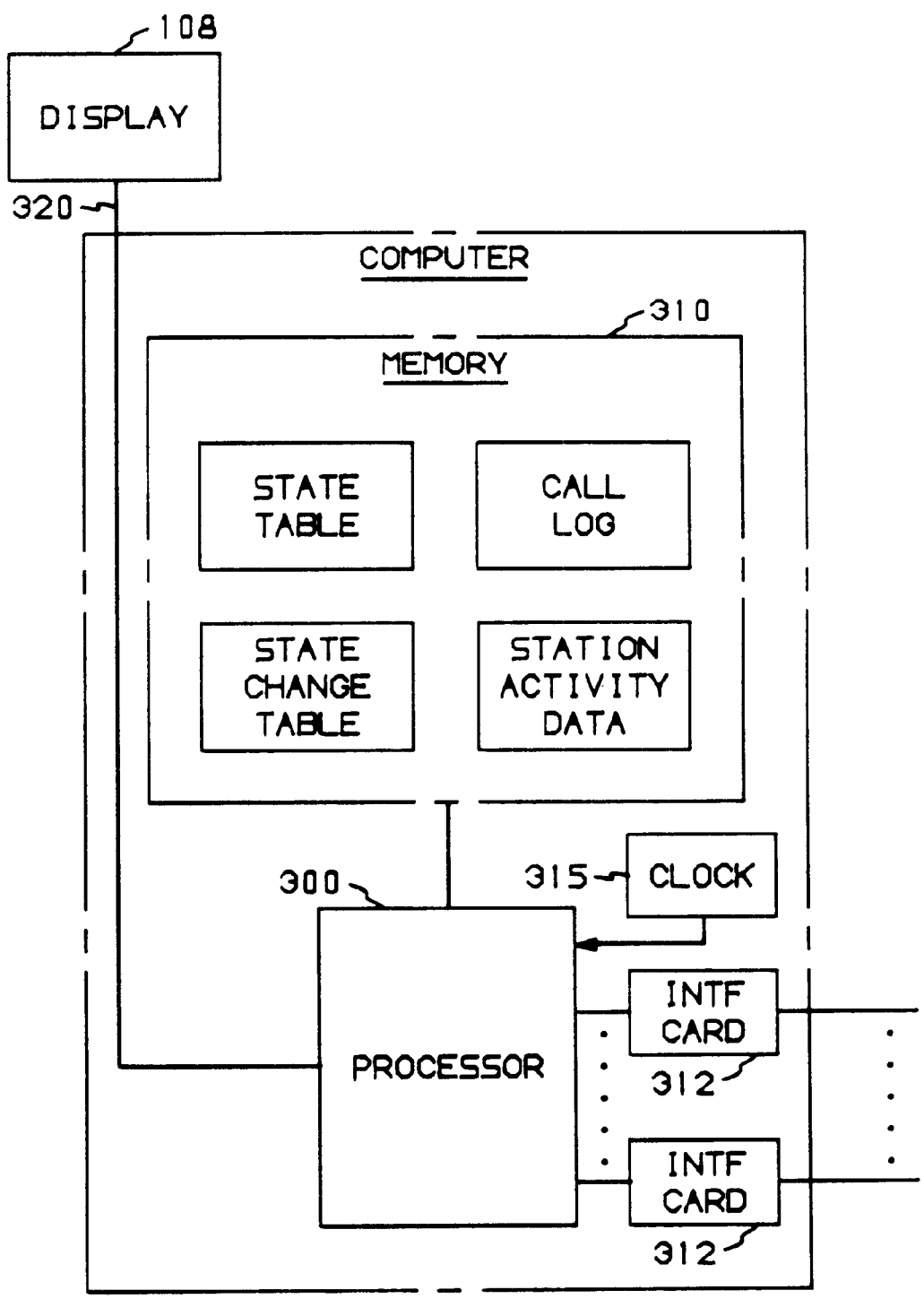
FIG. 3 is a block diagram representation of the computer of the arrangements of FIGS. 1 and 2.

The computer 101 or computer 241 may be a well-known personal computer such as the AT&T 6300 PLUS personal computer. FIG. 3 is a block diagram representation of the computers of FIGS. 1 and 2, comprising a program controller processor 300 for executing program sequences as depicted in FIGS. 4 through 10. The processor 300 is connected to one or more of the ISDN lines via commercially available interface cards 312. This may be the TELEOS ISDN PC card made by Teleos Communications Incorporated, which provides signal compatibility between the ISDN line and the computer. The computer further comprises a memory 310 for storing programs and data such as the State Table, the State Change Table, the Call Log and the Station Activity Data. A clock circuit 315 provides required clock signals to the processor 300 and a time-of-day signal used in generating time stamps for use in time recording. The processor 300 is connected to display, e.g. 108, via cable 320.

Figure 4:
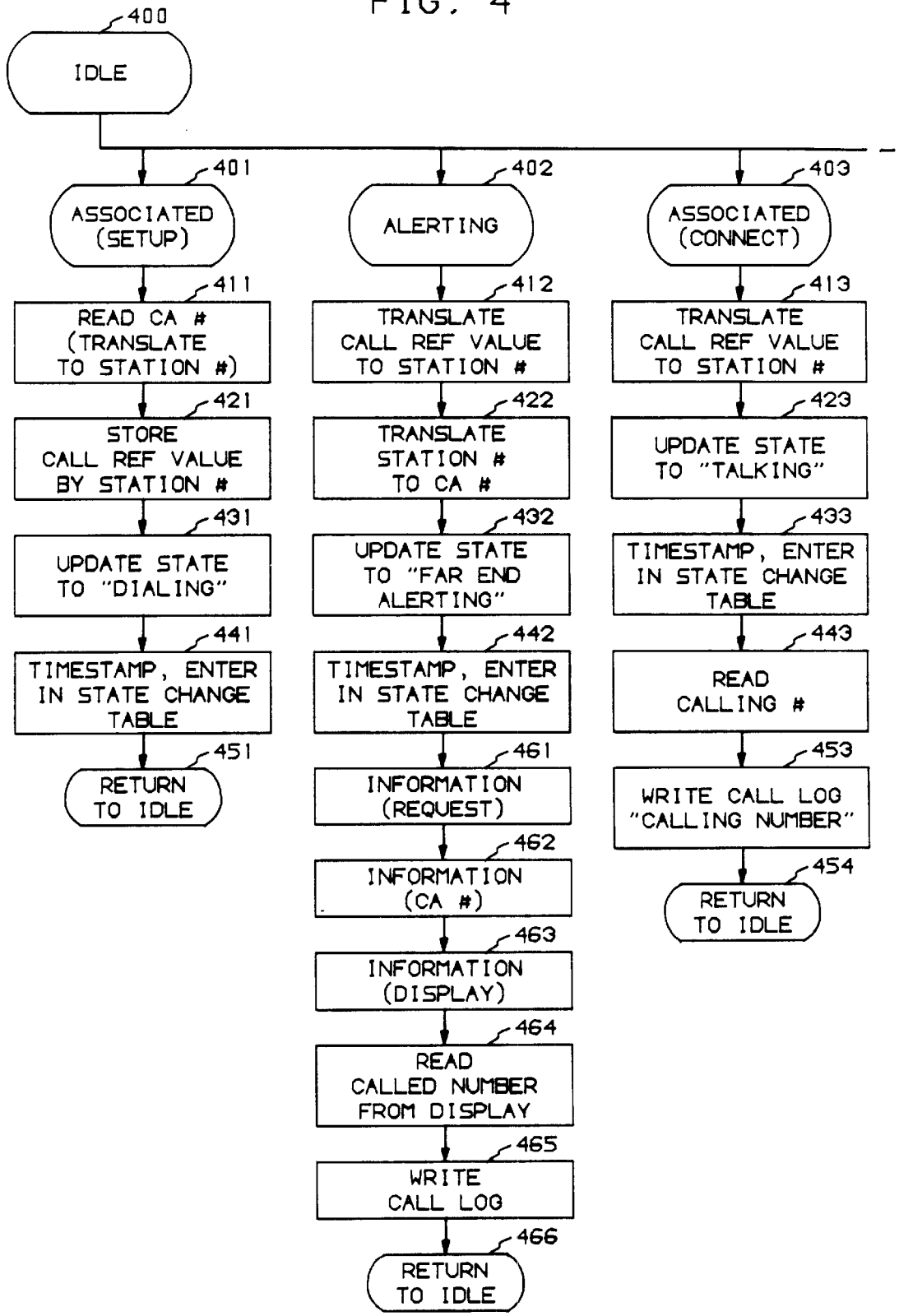
FIGS. 4 through 8 are flow chart representations of functions performed by the computer in deriving agent station operational data.
Figure 5:
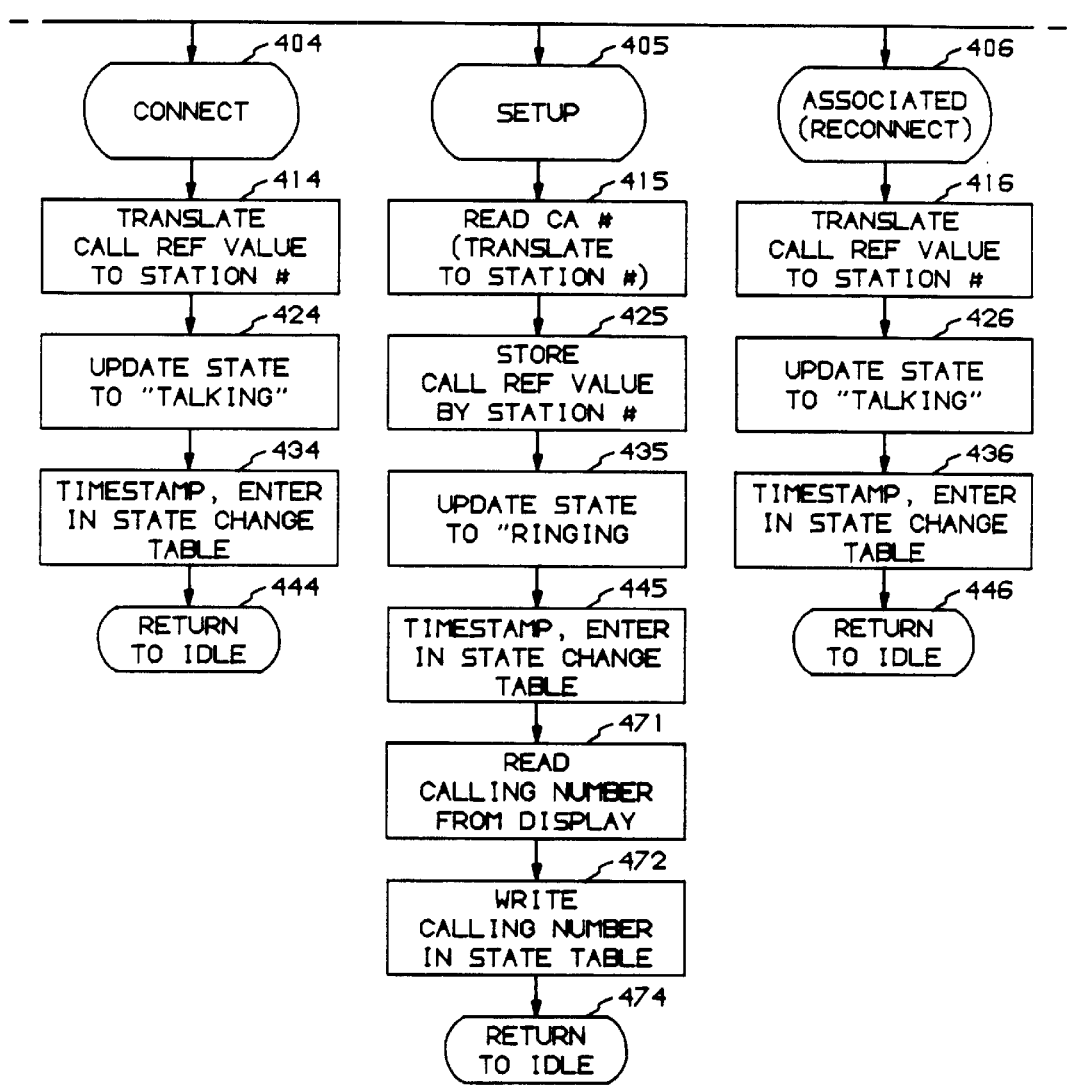
Figure 6:
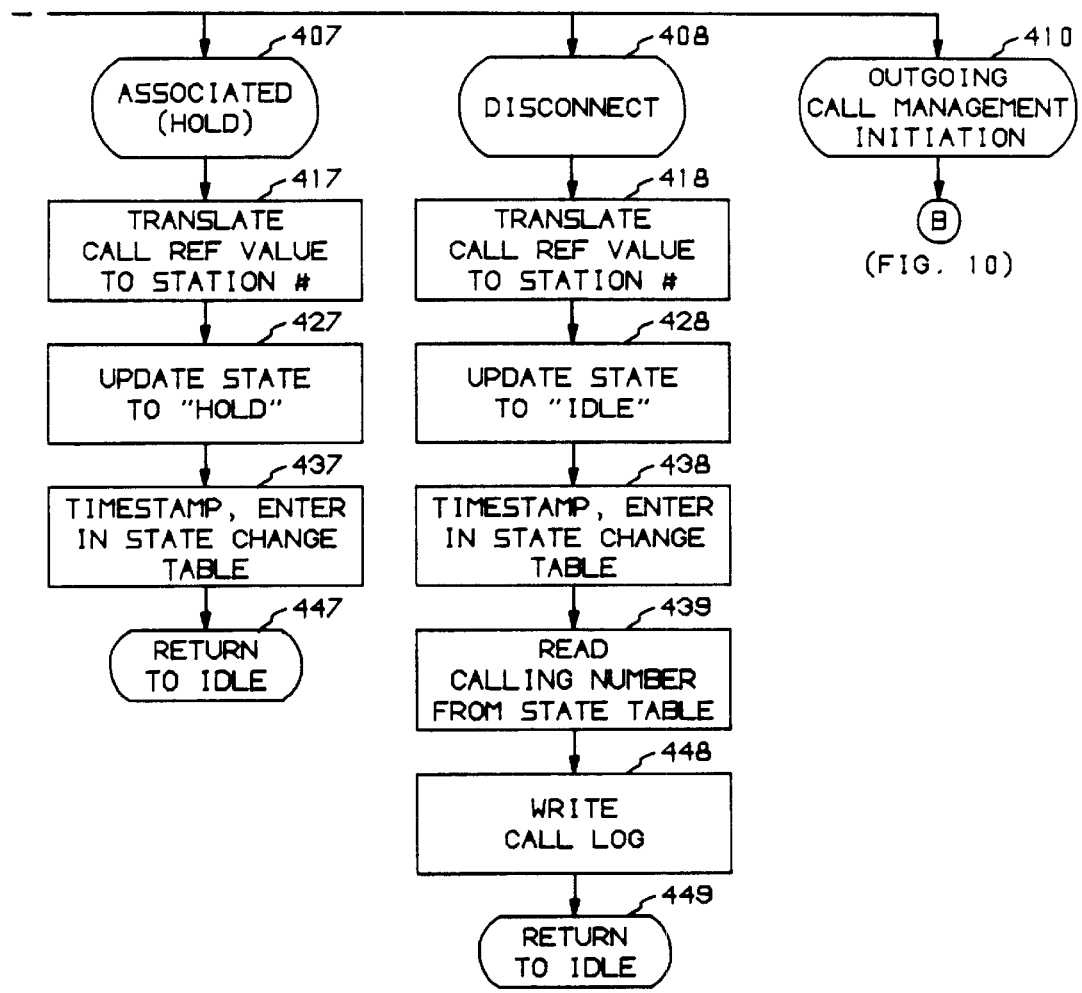
Figure 7:
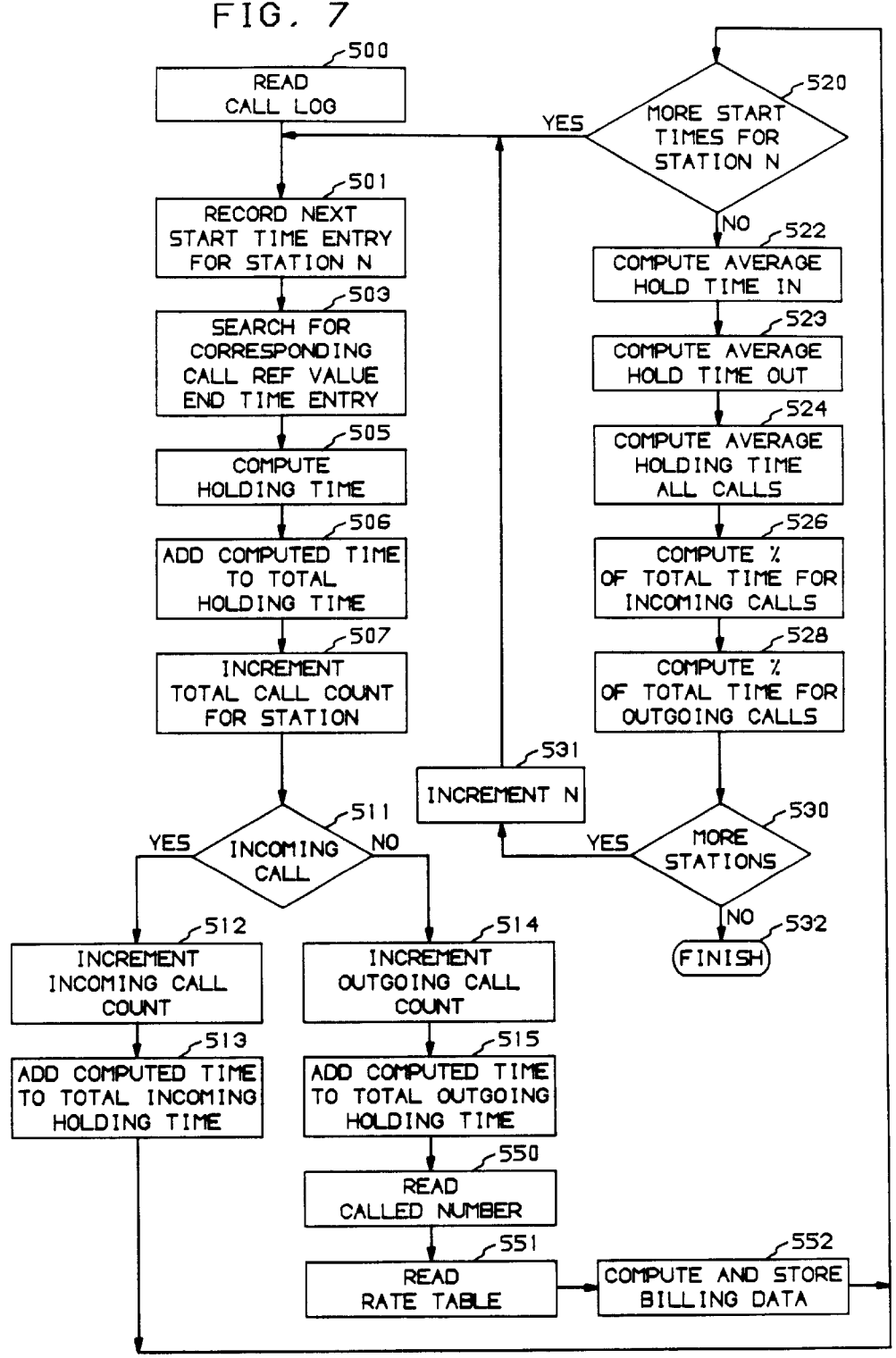
Figure 8:
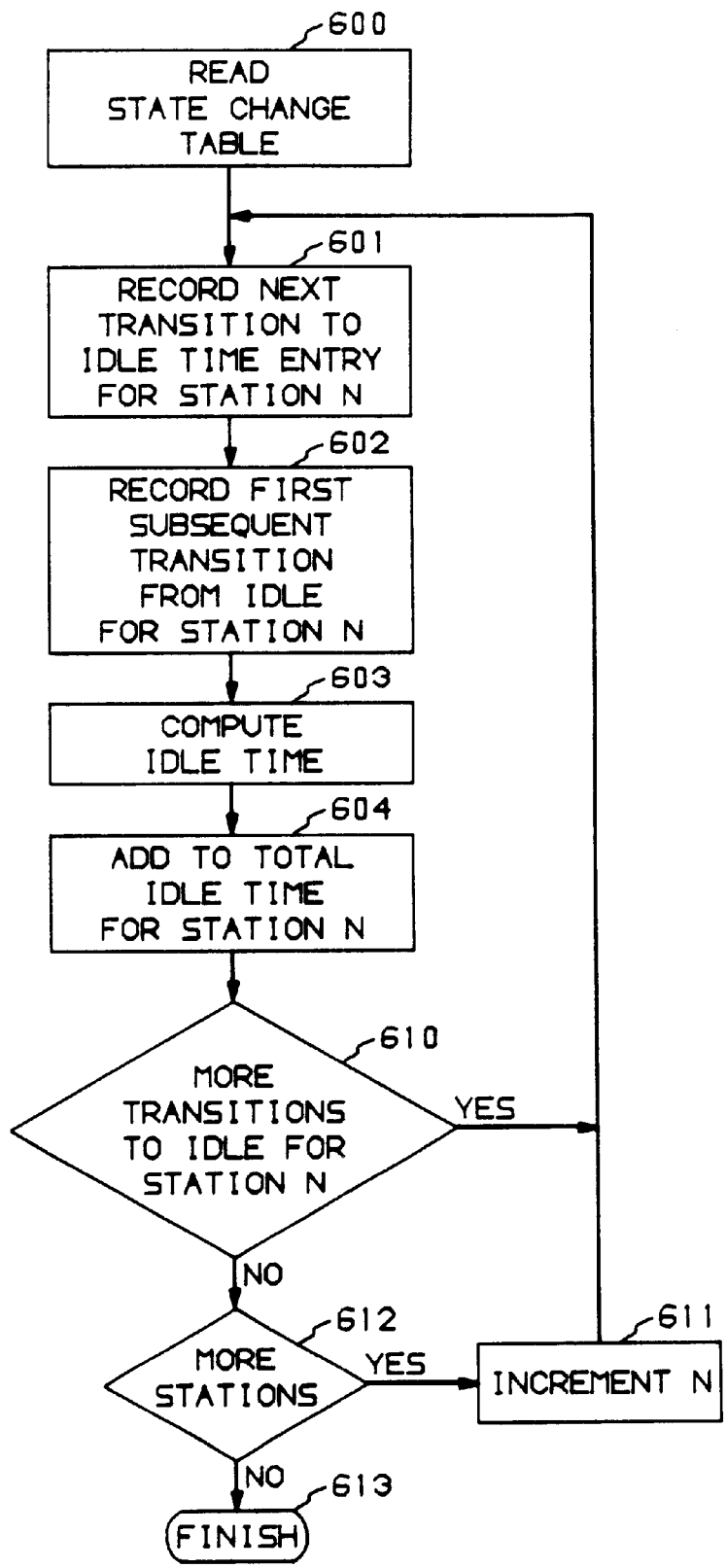
Figure 9:
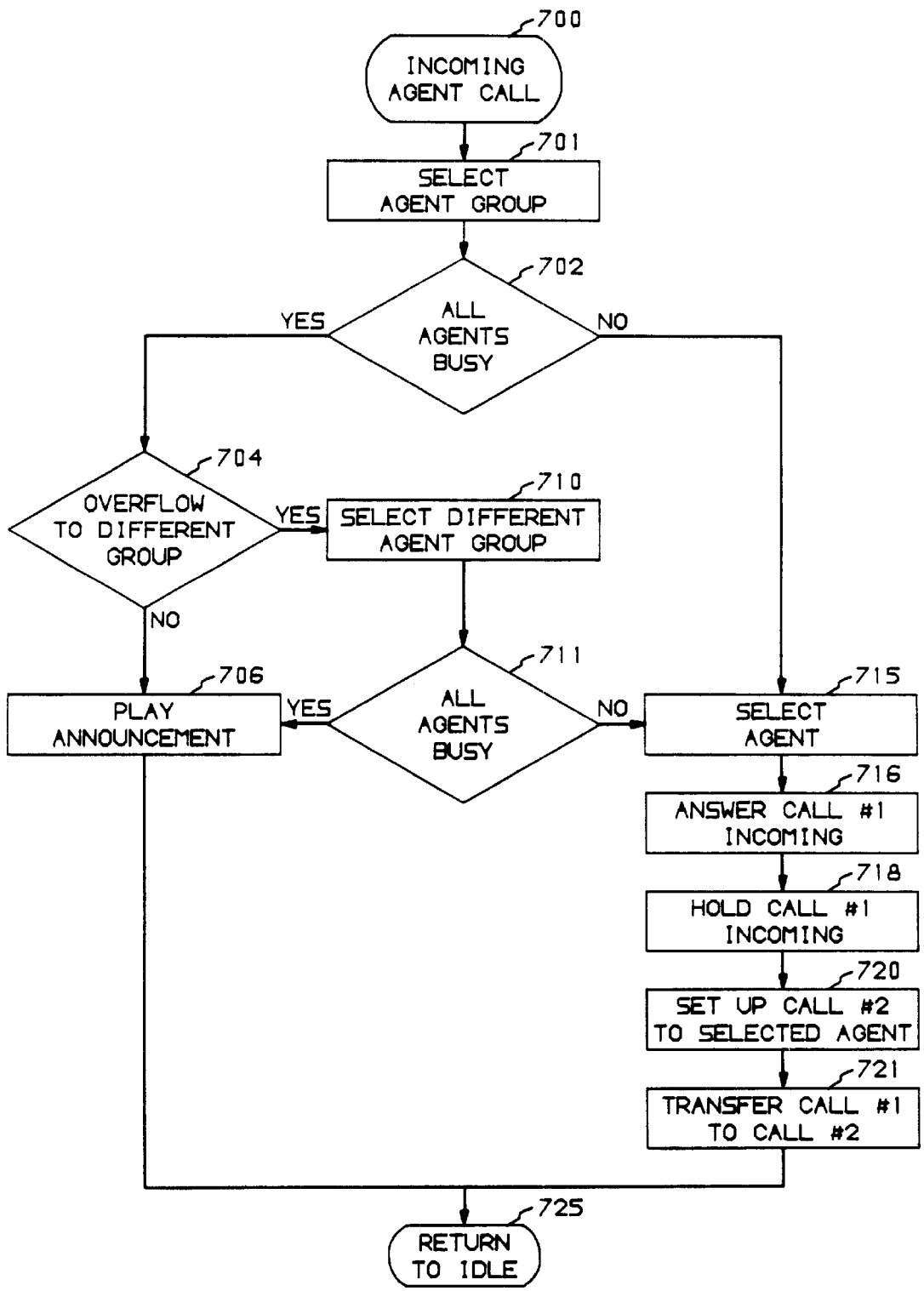
FIG. 9 is a flow chart representation of functions performed by the computer with respect to incoming calls.
Figure 10:
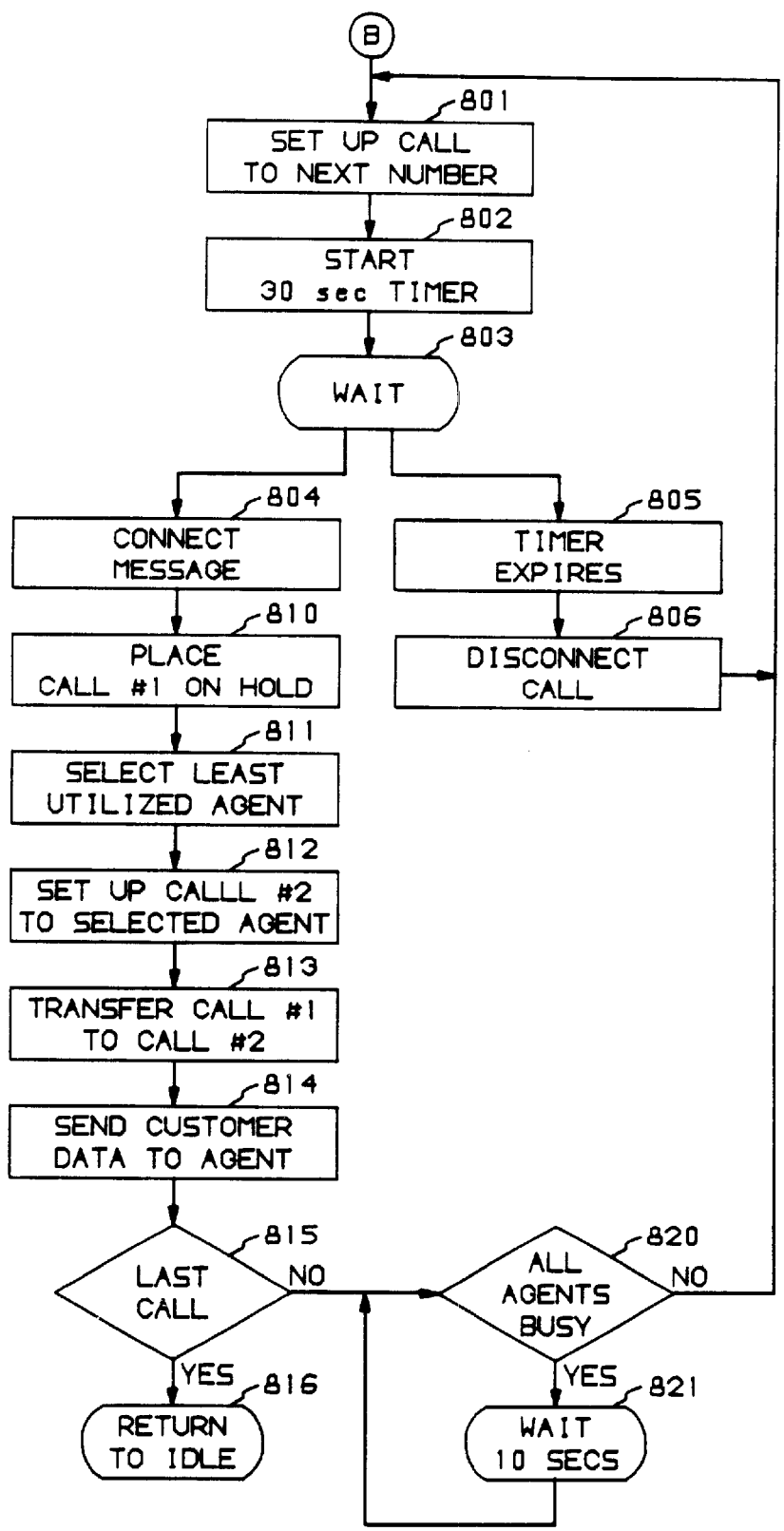
FIG. 10 is a flow chart representation of functions performed by the computer with respect to outgoing calls.

FIGS. 4 through 6 are flow chart representations of functions performed by the computer 101 in response to the various associated ISDN messages which the computer will receive via subscriber line 104 by virtue of the shared call appearance with each of the several agent stations 120. FIGS. 7 and 8 are flow chart representations of functions performed in computing station activity data. FIGS. 9 and 10 are flow chart representations of functions performed by the computer in managing incoming and outgoing calls for agent stations. The flow charts of FIGS. 4 through 10 are described in the following paragraphs with respect to computer 101 in FIG. 1. Analogous functions will be performed by computer 241 in the system of FIG. 2. In FIGS. 4 through 6, block 400 represents the idle state of the computer 101 and blocks 401 through 408 represent eight associated message types which will be transmitted to the computer from the switch. Table 1, in the first column, shows the messages exchanged over an ISDN subscriber line between the ISDN switch 110 and an ISDN subscriber station; the second column show the direction of the messages; the third column lists the corresponding shared call appearance associated ISDN messages received by the computer, and the fourth column lists the functional significance of the various messages to the computer. The computer 101 will receive these messages for the various shared call appearances as they are transmitted by the switch and may store the messages in buffers as they are received. FIGS. 4 through 6 show the sequences executed by the computer in recording relevant information extracted from the messages. By way of example, block 401 represents the processing of the ASSOCIATED (SETUP) message by the computer 101. The computer enters a program routine which advances to block 411 where it reads the origination call appearance number which is included in the ASSOCIATED (SETUP) message. Table 2 lists by way of example, typical information elements contained in a message. Each of the ISDN messages referred to herein is defined in the aforementioned Basic Rate Interface document. The call appearance number obtained from the message is translated into a station number in block 401 by means of information in the State Table stored in memory 310. The State Table contains directory numbers and call appearance numbers for each of the agent stations 120. The directory or station numbers and call appearance number are permanently assigned. Hence, the table allows for the translation between directory or station numbers and call appearance numbers. Other data in the table is altered as messages are received from the switch, including states of calls for each of the agent stations, call reference values for each of the calls and calling number information. Table 3 is an exemplary state table layout showing arbitrary directory numbers for seven agent stations 120, and arbitrarily assigned call states, call appearance numbers (CA), call reference values (CR) and calling numbers. In block 421 of FIG. 4, the computer stores the call reference value obtained from the ASSOCIATED (SETUP) message in the State Table with the corresponding call appearance number and station number. In block 431 the computer updates the state of the call in the State Table entry associated with the call appearance identified in the received message. As shown in the fourth column of Table 1, the computer interprets the ASSOCIATED (SETUP) message as corresponding to an origination dialing action. Accordingly, the state in the State Table is updated to dialing in response to this message. In block 441 a time stamp derived from the computer's clock 315 is entered in State Change Table in the computer memory 310 together with an indication of state change, i.e., idle to dialing, and the station number. An exemplary State Change Table memory layout is shown in Table 4. The contents of this table is used by the computer 101 to compile statistics reflecting agent activity, as will be described later herein with reference to FIGS. 7 and 8. In each case, upon completion of the various steps in response to the receipt of a message, the computer 101 will return to the idle state as indicated in block 451.

It should be understood that FIGS. 4 through 6 are representations of the action of the computer 101 in response to each of the different types of messages that it receives. The format and content of each of the individual message is defined in the aforementioned Basic Rate Interface document. In FIGS. 4 through 6, sequences of steps to be performed by the computer 101 are shown in connection with each of the different messages which may be received. In each case, the message received will include a call reference value. The call appearance values are included only in the ASSOCIATED (SETUP) message and the SETUP message. For the other messages the call reference value is translated into a station number by means of the information in the State Table (Table 3) in memory 310. The call reference value is a value assigned to a call for its duration. It uniquely identifies the call and is incorporated in all messages relating to the identified call. As indicated above with reference to the ASSOCIATED (SETUP) message, the call reference value is stored in the State Table in memory 310 at the time that message is received. For subsequently received messages, the call reference value is translated to a station number based on the relationship between the station number and the call reference value defined in the State Table. This action is reflected in blocks 412, 413, 414, 416, 417, and 418. The receipt of each message by the computer causes the state of the call in the State Table (Table 3) to be updated to the state represented by the received message. Table 1 recites function statements which indicate the interpretation that the computer 101 attaches to each of the messages. The step of updating the state information in the State Table is shown for example in blocks 431, 432, 423, 424, 435, 426, 427 and 428. In response to receiving each of the messages, the computer also generates a time stamp and enters the time stamp, together with state change information and the station number, in the State Change Table of memory 310. An exemplary memory layout for the State Change Table is shown in Table 4. The action of updating the State Change Table is reflected in blocks 441, 442, 433, 434, 445, 436, 437 and 438.

The sequence followed by computer 101 is essentially the same for the CONNECT, ASSOCIATED (RECONNECT), and ASSOCIATED (HOLD) and the steps have been described, generally, above. The actions of the computer 101 in response to the ALERTING message, the ASSOCIATED (CONNECT) message, the SETUP message, and the DISCONNECT message involve additional steps beyond those explained above and will be described in further detail. Block 402 represents the receipt of the ALERTING message from the switch 110. As shown in Table 1, the computer interprets this message as indicating that the far end, i.e., the called party, is being alerted. Block 412 represents a translation of the call reference value to station number with the aid of information in the State Table in memory 310. Block 422 indicates a further translation from station number to call appearance number also obtained from the State Table. In block 432 the state of the call in the state table is updated to "far end alerting". In block 442 the time stamp representing current time is entered into the State Change Table in memory 310 (Table 4) together with the station number and an indication of a state change from "dialing" to "alerting". For record keeping purposes it is desirable to record the called station directory number. The ASSOCIATED (SETUP) message, which precedes alerting, may include in its display field the outgoing call directory number. However, this field is optional and the directory number may be omitted from the ASSOCIATED (SETUP) message. In any event, the called line identification will be displayed on the agent terminal, as a normal ISDN feature, and is obtainable by an information message from the computer 101 to the switch 110. Block 461 represents the sending of such a message. Block 462 represents a follow-up message including the call appearance number which defines for the switch the identity of the desired display. Block 463 represents an information message from the switch 110 to the processor 101 providing the display information. Block 464 represents the action by the computer of reading the called number from the display information and block 465 represents entering this number in the Call Log in memory 310. An exemplary memory layout of the Call Log is shown in Table 5. The information entered in the Call Log includes a date and time stamp of current time, the station number derived in block 412, the called number obtained in block 464, the call reference value and an indication that this is the start of an outgoing call.

As outlined in Table 1, for a normally progressing call, the ALERTING message is followed by the CONNECT message and a DISCONNECT message. The processing of the CONNECT message by the computer is indicated in block 404 and the actions taken in response to the receipt of that message are indicated in blocks 414, 424, 434 and 444, as explained earlier. The receipt of the DISCONNECT message is shown in block 408. In addition to the actions taken in blocks 418, 428 and 438, which have been discussed earlier herein, the computer, in block 439, obtains the calling number, if any, from the State Table and makes an entry in the Call Log (Table 5) in memory 310, in block 448. The Call Log entry will include a date and time stamp, the station number, the far party number, the call reference value and an indication that this is the end of the call.

In the event of a termination of a call to one of the agent stations, a SETUP message is transmitted from the switch to one of the agents' terminals 120 and the same message is received by the computer 101, as illustrated in Table 1. In FIG. 5, block 405 represents the receipt of the SETUP message by the computer. The SETUP message will include a call appearance number and a call reference number. In block 405 the call appearance number is translated to a station number by means of the State Table represented by Table 2. In block 425 the call reference value defined by the message is entered in the State Table in memory 310. In block 435 the state of the call is updated to "ringing" in the State Table. An entry is made in the State Change Table in memory 103 (Table 4) including a time stamp indicating current time, the station number and an indication that the state has changed from "idle" to "ringing" in block 445. The SETUP message incorporates a display field defining the calling number when the Incoming Calling Line Identification (ICLID) feature is used. In block 471 this calling number is obtained from the display field and in block 472 it is entered into the State Table in memory 310. Thereafter, an advance is made to block 474 to return to idle.

The computer 101 expects to receive an ASSOCIATED (CONNECT) message after receipt of the SETUP message for an associated station, as indicated in Table 1. The receipt of this message is shown in block 403. In blocks 413, 423 and 433 the computer performs the functions of translating the call reference value to a station number based on information in the State Table, updates the State Table and updates the State Change Table. In block 443 the calling number is read from the State Table in memory 310 on the basis of the call reference value. In block 453 an entry is made in the Call Log in memory 310 including a time stamp, the agent station number, "incoming" and "start" indications, the calling number and the call reference value. When a subsequent DISCONNECT message is received, another Call Log entry will be made showing the ending time. The agent stations typically will have a Hold feature and when this is activated the computer receives an ASSOCIATED (HOLD) and a subsequent ASSOCIATED (RECONNECT). The receipt of these messages is represented by blocks 406 and 407 and the effect of these messages is to update the State Table (Table 3) and the State Change Table (Table 4) in memory 310 as described above. Block 420 shows a transition from the idle state by initiation of outgoing call management, which is described later herein with respect to FIG. 10.

Table 6 is a representation of station activity data which may be used to evaluate agent station activity. The data includes the number of incoming and outgoing calls and the total number of calls handled by each of the agent stations. In addition, the average holding (i.e. activated) time for incoming calls, outgoing calls and all calls as well as the percentage of time spent on incoming and outgoing calls and time spent in the idle state, are recorded in this table as described later herein with respect to FIGS. 7 and 8. Computer 101 generates these statistics on the basis of data in the State Change Table (Table 4) and Call Log (Table 5) in the memory 310.

FIGS. 7 and 8 are flow chart representations of the software of the computer 101 used to derive the information of Table 6 from the State Change Table and the Call Log. Referring to FIG. 7, the Call Log is read in block 500 and in block 501 a "start time" entry for a selected station number is recorded. In block 503 the Call Log is searched for a corresponding call reference value having the "end time" entry. In block 505 the holding time is computed as the difference between the start time and the end time. In block 506 the computed holding time is added to the total holding time for the station. In block 507 the total call count for the station is incremented by 1. Block 511 is a decision block to determine whether the call for which the computations are made is an incoming call. If so, the transfers made to block 512 where the incoming call count is incremented and the holding time computed in block 505 is added to the total incoming holding time for the selected station, in block 513. In the event that it is an outgoing call, a transfer will be made from decision block 511 to block 514 where the outgoing call count is incremented. In block 515 the computed time will then be added to the total outgoing holding time for the station. For both incoming and outgoing calls, the next action is to determine whether there are more start times for the station under consideration, as represented by decision block 520. If so, a transfer is made to block 501 and the steps between blocks 501 and 520 are repeated for the next call for station N. After all calls for a station have been recorded and holding times properly computed, the decision in block 520 will reflect the fact that there are no more start times for station N and a transfer will be made to block 522 to compute data for station N. Average holding times for incoming calls, outgoing calls and all calls for station N are computed in blocks 522 to 524. This is based on the recorded incoming, outgoing and total counts and the corresponding holding times. In blocks 526 and 528 the percentage of time spent for incoming and outgoing calls is computed based on the ratios of the total incoming and outgoing holding times with respect to the total holding time. Thereafter, in block 530 a decision is made to determine if there are other stations for which the computations need to be made. If so, the value of N is incremented in block 531 to identify the next station and the process, beginning at block 501 is repeated. When the statistics for all stations have been compiled, the program terminates as indicated in block 532.

In addition to generating station activity data, the computer is adapted to generate detailed billing records for outgoing calls made from the agent stations. In blocks 514 and 515 of FIG. 7 actions are taken with respect to outgoing calls as described above. Subsequent to these actions, in block 550, the called number is read from the Call Log (Table 5) in its Far Party column. Thereafter, in block 551 the computer reads a rate table stored in memory 310. The rate table is a data table customarily provided by a telephone company or long distance carrier which defines the charges for telephone calls to other areas by area code and the office code, both of which are part of the telephone number recorded in the Call Log. In the exemplary Call Log of Table 5, the area code is omitted from some of the numbers indicating that those numbers have the same area code as the central office switch to which the computer is connected. The charges customarily depend on the time of day the call was made as well as the length of time of the call. The length of time of the call was computed in block 505 of FIG. 7. The time of day, the fact that it is an outgoing call and the number of the called party are recorded in the Call Log. On the basis of this data the computer 101 computes billing data in a well-known fashion and stores such data in the memory 310 prior to advancing to decision block 520 for further action. This type of computing and storing billing data is indicated in block 552.

In this illustrative system, outgoing call data in Table 6 is intended to cover all outgoing calls, including unanswered calls. Starting times for outgoing calls are recorded in the Call Log in response to the ALERTING messages as shown in FIG. 4. However, that is before the call is answered. Hence, the billing computation shown in FIG. 7 includes ringing time and unanswered calls. If a more accurate billing computation is desired, the State Change Table may be consulted to identify unanswered calls (i.e. calls that did not make a change to the Talk State), and actual connect time, (i.e. from transition to the Talk State to disconnect).

FIG. 8 is a flow chart representation of a program for computing the time spent by each station and the idle state. A time limit may be imposed on the program to recognize only idle time periods occurring during working hours in order to exclude off periods such as lunch time, etc. As shown in FIG. 8, block 600, this program reads the State Change Table of the memory 310, (Table 4). In block 601 the computer records the entry time of the transition to the idle state for a station N and in 602 obtains the first subsequent transition in time from idle to another state. In block 603 the idle time is computed as the difference between those state changes and in block 604 the total idle time for the station is computed. Block 610 is a decision block to determine if there are more transitions to idle for this station if so, a transfer is made back to block 601 to repeat the steps of block 601 through 604. When all the transitions for a particular station have been recorded, a transfer is made to decision block 612 to determine if there are other stations to be considered. If so, the station number is incremented in block 611 and a return is made to block 612, for the next station. The number N is an arbitrary designation for a station number and the step of incrementing N in block 611 represents an action by the computer to find the next station for which idle time is to be computed. When statistics have been compiled for all the stations, the program finishes as indicated in block 613. The data computed by means of the programs outlined in FIGS. 7 and 8 may be stored in memory 310 as station activity data in the form of Table 6. This information may be displayed to a manager by means of the display 108 which is connected to the computer 101 via interconnecting cabling 320.

The computer 101 or 241, in addition to monitoring messages from the associated agent stations and periodically updating the station activity data, will also perform incoming and outgoing call management. The various associated messages received by the computer while carrying out the call management functions, may be buffered by the computer for later analysis and executed periodically. Alternatively, a multitasking computer will be able to perform these various functions concomitantly. The computer answers incoming calls directed to one or more directory numbers assigned to the computer, and places outgoing calls by exchanging standard ISDN messages over the ISDN subscriber line, in the same manner as an ISDN station set. Each of the ISDN messages received by the computer includes a call reference value which uniquely ties the message to a call. Hence the computer, by reference to the State Table and information about its own calls, can readily sort out messages relating to associated stations from messages relating to calls handled by the computer. The flow charts do not specifically show the sequences executed by the computer in handling ISDN messages for calls initiated by or terminated to the computer. However, such functions are essentially the same as those performed by a standard ISDN terminal and are well-known in the art.

In the illustrative system described herein, the computer 101 is adapted to respond to incoming calls to predefined directory numbers at ISDN switch 110, and to cause the ISDN switch 110 to transfer the call to one of the agent stations 120 selected by the computer 101. The agents, however, do not have to be connected to the switch at which the call is received. As discussed earlier herein with respect to FIG. 2, the computer may select an agent on another switch to which it is connected via a shared call appearance ISDN line. In the following paragraphs the description refers to the actions of computer 101 with respect to switch 110. Analogous functions are performed by computer 241 with respect to its associated switches. When an incoming call is received, the computer uses available information such as the called directory number included in the SETUP message to select an appropriate group of agents for answering the particular call. The called number is used for these purposes, for example, when different directory numbers represent different products or services. Alternatively, agents may be selected on the basis of the calling number. For example, certain large customers may preferably be handled by a designated group of agents. The ISDN SETUP message will include the calling number when the Individual Calling Line Identification (ICLID) feature is used. As is evident from Table 1, when the call is directed to the computer, it will receive a SETUP message from the switch. FIG. 9 is a flow chart representation of functions performed by the computer in response to an incoming call to be handled by one of the agents. Block 700 represents the transition from the computer idle state in responding to a SETUP message for such a call. In block 701 of FIG. 9, the computer selects an agent group. This may be done on the basis of the called directory number answered by the computer, if certain agents have been chosen to answer calls to a particular directory number in preference to other agents. In block 702 a determination is made as to whether all the agents of the selected group are busy. If so, another determination is made in decision block 704 and a decision is made, based on whether calls to this particular directory number should be transferred to a different group if all agents of the preferred group are busy. If not, an advance is made to block 706 where an announcement is played to the calling party indicating that all agents are busy. Thereafter, the computer returns to the idle state in block 725. If overflow to a different group is desired, a transfer will be made from decision block 704 to block 710 where a different agent group is selected in accordance with predefined criteria furnished to the computer. Thereafter, in block 711 a test is made to determine whether all agents of the newly selected group are busy if so, a transfer is again made to block 706 to play the announcement. The process of selecting a different group can be repeated as often as desired. In the event that the tests carried out in either block 702 or 711 indicates that the agents of the desired group are not all busy, an idle agent is selected in block 715. To find whether agent stations are busy or idle, the computer consults the State Table (Table 2) where the computer records the idle state and other states of each of the stations on the basis of the associated messages received by the computer for each of the shared call appearance agent stations. The agent may be selected on the basis of which station has had the most idle time. The computer computes and records the idle time of each agent station in the station activity data area of memory 310 (Table 6), by execution of the program sequences FIG. 8. This program may be run periodically to determine total idle time for each station, since a specified point in time.

After an agent has been selected, the computer will originate a call through the ISDN switch to the selected one of the agent stations and then transfer the incoming call to the call set up between the computer and the selected agent station. This transfer is accomplished by means of the so-called "explicit transfer" described in the above-noted ISDN Basic Rate Interface document. Before the transfer is effected, however the computer answers the incoming call by sending a standard CONNECT message to the switch. This is represented by the action of block 716 of FIG. 9. In block 718 the computer sends a HOLD message to the switch to put the incoming call (call 1) in the hold state. In block 720 the computer 101 exchanges the necessary ISDN messages with the switch 110 to set up the call from the computer to the selected agent (call 2). In block 721 the TRANSFER message is sent to the switch 110. The transfer message defines the call reference value of both the incoming call and the call extended to the agent, and the switch will respond by interconnecting the two calls and clearing the connections to the computer. Thus, the incoming call is connected to the agent selected by the computer, under the control of the computer, using standard ISDN messages between the computer 101 and the switch 110. Upon completion of these steps, a return is made to the computer idle state as indicated in block 725.

The computer 101 is further adapted to perform outgoing call management for a number of agents. These agents may be connected to the same ISDN switch as the computer 101, as shown for example in FIG. 1. Alternatively, the agents may be connected to a different ISDN switch as shown in FIG. 2. Outgoing call management may be initiated by means of an input message, for example from a computer keyboard. As part of this initiation, the computer, by means of an operator or possibly from another computer, will receive a list of customer directory numbers. The computer will initiate calls the directory numbers one at a time and make a connection to an available agent when the called party answers. FIG. 10 is an exemplary sequence of steps performed by the computer software in accomplishing this function. Block 410 of FIG. 6 represents the transition from the computer idle state in response to an outgoing call management initiation message. In block 801 of FIG. 10 the computer initiates an outgoing call via the ISDN switch to which it is connected. This involves transmitting the SETUP message to the switch and receiving other messages from the switch. After having sent the SETUP message, the computer may advance to block 802 to start a timer and proceed to the wait state shown in block 803. The timer set in block 802 may, for example be a 30-second timer. One of the messages to be received by the computer from the switch is the CONNECT message indicating that the called party has answered. This message, like other ISDN call handling messages, includes a call reference value unique to this call. This data allows the computer to distinguish between messages relating to this outgoing call and associated messages received by virtue of shared call appearances with the agent stations. Receipt of the CONNECT message for this call is represented by block 804 indicating that the computer will leave the wait state when that message is received. In the event that the called party does not answer within the prescribed 30-second time period, the computer will leave the wait state due to the fact that the timer has expired as indicated in block 805. In that case, the computer in block 806 will transmit a DISCONNECT message to the switch and return to block 801 to set up a call to the next number, in block 801. If the CONNECT message is received within the prescribed time period, as indicated in block 804, the computer will transmit the HOLD message to the switch placing the answered call on hold, as indicated in block 810. Thereafter, as indicated in block 811, the computer selects the least utilized idle agent. The computer obtains information as to whether an agent station is in the idle state from the State Table (Table 3) and obtains information about the total amount of time spent in the idle state over a predefined time period from station activity data represented, for example in Table 6. After having selected an agent to handle the outgoing call placed by the computer, the computer sets up a call to the selected agent. This is shown in block 812 of FIG. 10. This is referred to as call number 2, call number 1 being the call placed by the computer. In setting up the call to the selected agent the computer again exchanges the appropriate ISDN messages with the switch to which it is connected. Thereafter, as indicated in block 813 the computer sends a TRANSFER message to the connected switch identifying call 1 and call 2, thereby causing the switch to bridge the two calls and to clear the connections between the computer and the switch for these two calls.

For outgoing call management, the computer, in addition to being provided with a list of customer numbers to be called, may also be provided with data relating to the customer. The computer, as indicated in block 814 sends the appropriate customer data to the selected agent. This may be accomplished by means of another call to the agents display terminal. For example, in FIG. 1 each of the agent stations 120 has a display terminal 122. Thus, this action becomes a simple data transfer through the ISDN switch in a known fashion. After having sent the data to the selected agent, the computer tests whether the last call handled was the last call on the list of calls to be placed by the computer. This is indicated in decision block 815. If this is the last call, the program will return to the idle state, as indicated in block 816. If this is not the last call, the computer performs a test as indicated in decision block 820 to determine if all agents are busy. If so the computer waits for 10 seconds and repeats the all-agent busy test. If not all agents are busy, the program returns to block 801 to set up the call to the next number. The agent busy test is incorporated in the program in order to avoid initiating a number of outgoing calls to customers without having agents available when the customer answers. Other schemes may be devised for regulating the rate at which outgoing calls are initiated. For example, a standard time delay may be introduced between outgoing call initiations, derived on the basis of the average holding time per agent, or a means of buffering answered calls in the event that all agents are busy when a call is answered may be provided. Similarly, other outgoing call algorithms may be devised to increase efficiency of agents.

It is to be understood that the above-described arrangement is merely an illustrative application of the principals of the invention. Numerous other arrangements may be devised by those skilled in the art without departing from the spirit and scope of the invention.

TABLE 1

| MESSAGE FLOW ON THE AGENT STATION | DIRECTION | MESSAGES RECEIVED BY THE COMPUTER | FUNCTION STATEMENT |
|---|---|---|---|
| CALL ORIGINATIONS: | | | |
| SETUP | STATION → SWITCH | | |
| SETUP_ACK | SWITCH → STATION | ASSOCIATED (SETUP) | DIALING |
| CALL_PROCEEDING | SWITCH → STATION | | |
| ALERTING | SWITCH → STATION | ALERTING | FAR END ALERTING |
| CONNECT | SWITCH → STATION | CONNECT | TALKING |
| CONNECT_ACK | STATION → SWITCH | | |
| DISCONNECT | SWITCH → STATION STATION → SWITCH | DISCONNECT | RETURN TO IDLE |
| CALL TERMINATIONS: | | | |
| SETUP | SWITCH → STATION | SETUP | RINGING |
| ALERTING | STATION → SWITCH | | |
| CONNECT | STATION → SWITCH | ASSOCIATED (CONNECT) | TALKING |
| DISCONNECT | SWITCH → STATION or | DISCONNECT | RETURN TO IDLE |
| FEATURE ACTIVITIES: | | | |
| HOLD | STATION → SWITCH | | |
| HOLD_ACK | SWITCH → STATION | ASSOCIATED (HOLD) | HOLD |
| RECONNECT | STATION → SWITCH | | |
| RECONNECT_ACK | SWITCH → STATION | ASSOCIATED (RECONNECT) | TALKING |

TABLE 2

Message Information Elements
Protocol Discriminator
Call Reference
Message Type
Bearer Capability
Channel Identification
Progress Indicator
Terminal Capabilities
Keypad
Signal
Switchhook
Locking Shift
Selected Call Appearance
Origination Call Appearance
Destination Call Appearance
Display Field
Feature Activation
Feature Indication
Adjunct Control

TABLE 3

STATE TABLE

| Station Number | Call Appearance (CA) # | State | Call Reference (CR) Value | Calling Number |
|---|---|---|---|---|
| 555-6012 | 4 | Idle | — | |
| 555-6013 | 5 | Dialing | 28 | |
| 555-6014 | 6 | Dialing Complete | 21 | |
| 555-6015 | 7 | Ringing | 4 | 312-555-7000 |
| 555-6016 | 8 | Talking | 72 | |
| 555-6017 | 9 | Far End Alerting | 61 | |
| 555-6018 | 10 | Hold | 15 | |

TABLE 4

STATE CHANGE TABLE

| Date | Time | Station # | State Change |
|---|---|---|---|
| 12/05/88 | 1:52:45 | 555-6012 | Idle to Dialing |
| 12/05/88 | 1:53:00 | 555-6012 | Dialing to Far-End-Alert |
| 12/05/88 | 1:53:40 | 555-6012 | Far-End-Alert to Talk |
| 12/05/88 | 2:05:17 | 555-6012 | Talk to Idle |
| 12/05/88 | 2:15:01 | 555-6017 | Idle to Ring |
| 12/05/88 | 2:16:02 | 555-6017 | Ring to Idle |

TABLE 5

CALL LOG

| Date | Time | Station # | Direction | Start/End | Far Party | Call Ref. |
|---|---|---|---|---|---|---|
| 12/05/88 | 1:12:05 | 555-6015 | Incoming | Start | 312-555-7000 | 4 |
| 12/05/88 | 1:53:00 | 555-6012 | Outgoing | Start | 712-5053 | 3 |
| 12/05/88 | 2:05:07 | 555-6015 | | End | 312-555-7000 | 4 |
| 12/05/88 | 2:05:17 | 555-6012 | | End | | 3 |
| 12/05/88 | 2:16:02 | 555-6017 | | End | 312-555-7000 | 9 |

TABLE 6

STATION ACTIVITY DATA

| Measurement | Station 6012 | Station 6013 | Station N |
|---|---|---|---|
| No. of IN calls | X | X | X |
| No. of OUT calls | X | X | X |
| Total No. of calls | X | X | X |
| Average Holding Time IN calls | X | X | X |
| Average Holding Time OUT calls | X | X | X |
| Average Holding Time ALL calls | X | X | X |
| % of time spent in IN calls | X | X | X |
| % of time spent in OUT calls | X | X | X |
| time spent in idle state | X | X | X |

What is claimed is:

1. A telephone agent call management arrangement for use with an ISDN central office switching system having a plurality of telephone agent stations connected thereto with each of said telephone agent stations having a display terminal, comprising:

computer means connected to said switching system via an ISDN facility for receiving from said switching system data defining the states of said stations;

said computer means responsive to an incoming call extended to a directory number assigned to said computer to select one of said stations for handling said call, on the basis of said received data;

further responsive to said call to transmit to said switching system ISDN messages identifying said selected station for causing said switching system to connect said call to said selected station; and further responsive to said call for transmitting customer data to said display terminal of said selected station over ISDN facilities established between said computer means and said selected station.

2. A telephone agent call management arrangement in accordance with claim 1 wherein said ISDN messages transmitted by said computer means comprise messages for establishing a call from said computer means to said selected station and messages for causing said switching system to interconnect said incoming call and said call to said selected station.

3. A telephone agent call management arrangement for use with a plurality of agent stations connected to an ISDN central office switching system, comprising:

processor means;

memory means for storing data; and interface circuitry for interfacing said processor means to an ISDN subscriber line connected to said switching system;

said processor means responsive to ISDN messages from said subscriber line defining the states of said agent stations for interpreting said ISDN messages and recording in said memory means data defining the states of said agent stations; and said processor means responsive to ISDN messages from said subscriber line defining a call to said computer for selecting one of said agent stations on the basis of said recorded data and transmitting on said subscriber line ISDN messages defining the establishment of a call from said computer to said selected station and messages defining said incoming call and said call to said selected agent and requesting an interconnection between said calls.

4. A telephone agent call management arrangement in accordance with claim 3 wherein each of said telephone agent stations having a display terminal; and said computer means further responsive to said ISDN messages from said subscriber line defining a call to said computer for transmitting customer data to said display terminal of said selected station.

5. A telephone agent call management arrangement in accordance with claim 4, wherein said customer data is transmitted over ISDN facilities established between said computer means and said selected station.

6. The telephone agent outgoing call management arrangement for use with a plurality of central office switching systems each having at least one telephone agent station connected thereto with each telephone agent station having a display terminal, comprising:

processor means; and interface means for interconnecting said processor means via ISDN facilities to each of said central office switching systems;

said processor means responsive to messages transmitted by each of said switching systems, representative of the states of said agent stations for recording data defining said states of each of said agent stations;

said processor means initiating a call to a subscriber connected to a first one of said switching systems and initiating a call to one of said agents connected to a second of said switching systems, via said first and said second switching systems, and responsive to a message from said first switching system indicating an answer at said subscriber station for transmitting to said first switching system a message for causing said first switching system to interconnect said first and said second calls; and said processor means is further responsive to said message representing an answer indication to transmit to said display terminal data associated with the subscriber station over ISDN facilities established between said computer means and said selected station.

* * * * *